(12) United States Patent
Kemeny

(10) Patent No.: US 6,808,727 B2
(45) Date of Patent: Oct. 26, 2004

(54) MEAL-EQUIVALENT FOOD BAR

(76) Inventor: Emanuel S. Kemeny, 1400 S. Joyce St. #602, Arlington, VA (US) 22202

( * ) Notice: Subject to any disclaimer, the term of this patent is extended or adjusted under 35 U.S.C. 154(b) by 0 days.

(21) Appl. No.: 09/909,014

(22) Filed: Jul. 20, 2001

(65) Prior Publication Data

US 2003/0017233 A1 Jan. 23, 2003

(51) Int. Cl.[7] ............................................. A23L 1/164
(52) U.S. Cl. ......................... 426/76; 426/87; 426/115; 426/120; 426/89; 426/93; 426/94
(58) Field of Search .............................. 426/76, 87, 115, 426/120, 94, 93, 89, 810; 424/467, 441

(56) References Cited

U.S. PATENT DOCUMENTS

| | | | | |
|---|---|---|---|---|
| 395,243 A | * | 12/1888 | Maggi | 426/87 |
| 428,502 A | * | 5/1890 | Maggi | 426/89 |
| 1,174,826 A | | 3/1916 | Chapman | |
| 1,855,145 A | | 4/1932 | Jones | |
| 2,168,360 A | | 8/1939 | Musher | |
| 2,278,466 A | * | 4/1942 | Musher | 426/89 |
| 2,538,202 A | | 1/1951 | Kimball | |
| 2,634,210 A | | 4/1953 | Kimball | |
| 3,336,139 A | * | 8/1967 | Mech et al. | |
| 3,431,112 A | * | 3/1969 | Durst | 426/89 |
| 3,869,555 A | * | 3/1975 | Heonis | 426/594 |
| 3,882,253 A | | 5/1975 | Schafer et al. | |
| 3,892,867 A | * | 7/1975 | Schoonman | 426/112 |
| 3,903,308 A | * | 9/1975 | Ode | 426/93 |
| 4,055,669 A | * | 10/1977 | Kelly et al. | 426/93 |
| 4,215,104 A | * | 7/1980 | Ullman et al. | 426/76 |
| 4,313,961 A | * | 2/1982 | Tobia | |
| 5,756,124 A | * | 5/1998 | Patel et al. | 426/76 |
| 5,906,833 A | | 5/1999 | Klatz | |
| 6,143,335 A | | 11/2000 | McKenzie | |
| 6,572,904 B2 | * | 6/2003 | Rhee | |

FOREIGN PATENT DOCUMENTS

| | | | | |
|---|---|---|---|---|
| BE | 1009616 | * | 6/1997 | 426/76 |
| DE | 20000935 | * | 10/2000 | |
| EP | 347014 | * | 12/1989 | |
| GB | 11608 | * | 11/1902 | 426/120 |
| GB | 21665 | * | 1/1908 | 426/589 |
| GB | 4093 | * | 10/1915 | 426/120 |
| JP | 57-194765 | * | 11/1982 | 426/76 |
| WO | WO98/37768 | * | 9/1998 | |

OTHER PUBLICATIONS

Food Product Design, 8(4) 63–81 "Raising The Health & Energy Bar" (Dialog 00652604 Item 3, Fig 53), Jul. 1998.*
Convenience Store News, 36/10 "Quaker Oats" (Dialog 302870, Item 2, Fig 79), Aug. 7, 2000.*
Int'l New Product Report, p. 27 "Low Calorie Bars" (Dialog 207479 Item 3, Fig 79), Aug. 24, 1990.*
Int'l New Product Report (10) p. 15 "Diet Bars" (Dialog 204227 Item 4, Fig 79), May 18, 1990.*
Food Product Design 9(6) 101–125 "Bar Talk" (Dialog 00829484, Item 2, Fig 53), Sep. 1999.*

* cited by examiner

Primary Examiner—Steven L. Weinstein

(57) ABSTRACT

An improved meal-substitute food bar, herein called a meal-equivalent food bar because it is divided into segments equivalent to the sequence of courses in a conventional meal, including appetizer with functional appetite stimulants; main-course with major nutrition ingredients; and desert with functional appetite depressants. Further, the food bar is divided frangibly lengthwise into strips, each strip a selectable meal-equivalent with pre-determined calories. As a result, the meal-equivalent food bar provides a meal with improved physiological and psychological values for a consumer.

12 Claims, 1 Drawing Sheet

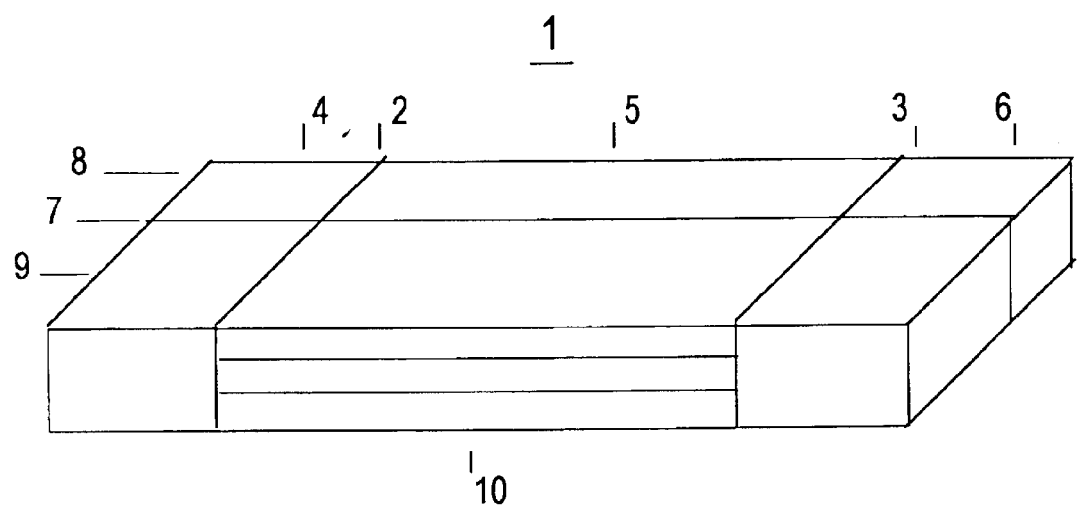

MEAL-EQUIVALENT FOOD BAR

BACKGROUND OF THE INVENTION

The invention is in the field of ready-to-eat food bars, and more particularly, meal-substitute food bars.

The prior art reveals many alternative types of food bars which provide nutrition as snacks, meal supplements, or meal substitutes. The ingredients are selected and processed for desired food bar characteristics, formed in cylindrical or rectangular shapes, finally processed, and packaged to provide portable convenience in handling and eating.

Well-known examples include:

Cake and Candy bars such as: [BABE] BABY RUTH (™), a solid cylindrical bar of continuous aggregate ingredients coated with a layer of chocolate; MOUNDS (™), disconnected coated segments of a cored rectangular bar; and CADBURY CHOCOLATE (™), a rectangular bar divided into a grid of frangibly-connected portions; [OLEO] OREO (™) cookies, a sandwich of wafers and creamy center; and Dietary bars, which provide ingredients for normal or special diets, and feature dietary proportions of carbohydrates, proteins, and fats, plus vitamins, minerals and functional additives. Examples include: Diabetic bars low in sugar, salt, and animal fat; Energy bars high in sugar, and Body-Building bars high in protein.

Dietary food bars have ingredients to help health problems such as heart, diabetes, and overweight conditions. Diets include those recommended by the American Heart Association (AHA), American Diabetes Association (ADA), Dr. Atkins, and Dr. Sears. The AHA and ADA diets suggest calorie proportions: 55% Carbohydrate, 15% Protein, and 30% (or less) Fat, with low sugar and salt, high fiber, and smaller meals more often in a day. The Sears and Atkins diets suggest less carbohydrate.

Further, the U.S. Food and Drug Administration (FDA) suggests total daily calories of 2000 for men, and 1600 for women, less for weight loss and the elderly, and more for the very active. A "meal" may be defined as 25% of the daily nutrition requirements.

The prior art also reveals adding flavors to the food bars to improve taste.

In view of the above background, the following prior art patents are cited as pertinent, revealing a variety of useful techniques in making and using food bars. Comments are included to point out their relevence and divergence with respect to critical features of this invention:

[1] U.S. Pat. No. 2,634,210, Kimball, F. T., issued Apr. 7, 1953, teaches a rectangular chocolate bar with two layers to separate incompatable components, and with frangible transverse scored lines.

[2] U.S. Pat. No. 2,538,202, Kimball, F. T., issued Jan. 16, 1951, teaches a two-layer chocolate bar in cylindrical disc shape, in which a chocolate outer layer enrobes the core inner layer. The layers separate incompatible ingredients. Other essential ingredients are suggested if the food bar is to be the sole diet for a considerable time.

[3] U.S. Pat. No. 6,143,335, McKenzie, R. G., issued Nov. 7, 2000, teaches scoring a food bar into bite-sized pieces thus providing a method for delivering exact quantities of supplemental ingredients to animals or humans.

[4] U.S. Pat. No. 5,906,833, Klatz, R. M., issued May 25, 1999, teaches a dietary supplement food bar in plural parts which are chronologically appropriate for consumption.

[5] U.S. Pat. No. 4,820,533, Seaborne, et al, issued Apr. 11, 1989, teaches composition and manufacture of an edible barrier laminate to separate different food phases.

[6] U.S. Pat. No. 4,451,488, Cook, M. L., issued May 29, 1984, teaches composition and manufacture of a soft and chewy granola bar by adding polyhydric alcohols.

[7] U.S. Pat. No. 4,496,606, Michnowski, J., issued Jan. 29, 1985, teaches composition and manufacture of a dietetic snack-bar with high fiber guar gum for a Type II diabetic.

[8] U.S. Pat. No. 6,159,506, Bieser, A. H., issued Dec. 12, 2000, teaches folic acid in a food supplement to help quell stressful attacks on normal physiological and psychological functioning.

[9] U.S. Pat. No. 6,207,638, Portman, R., issued Mar. 27, 2001, teaches a nutritional composition which enhances appetite satiety for individuals who are: overweight, Type II diabetic, or bulemic.

[10] U.S. Pat. No. 2,168,360, Musher, A., issued Aug. 8, 1939, teaches a composition of solid food materials using fat as a carrier, with different types of products in block form in a single container.

[11] U.S. Pat. No. 1,174,826, Chapman, M. S., issued Mar. 7, 1916, teaches a pie of plural non-communicating sections which may contain different ingredients, with separable portions conveniently eaten.

[12] U.S. Pat. No. 1,855,145, Jones, W. B., issued Apr. 19, 1932, teaches an edible cake or candy bar with alternating wedge sections of ingredients to vary the proportions as the bar is eaten, thus improving taste saturation and psychological effects of anticipation.

[13] U.S. Pat. No. 3,882,253, Schafer, et al, issued May 6, 1975, teaches a compacted and dehydrated food bar easily bitten and chewed, using 10% potato particles and 90% non-potato food bar forming ingredients.

COMMENT: The prior art discussed above reveals many useful techniques in making and using food bars, but is severely limited in features for avoiding boredom, controlling appetite, and adjusting caloric intake—these features provided by the present invention, and thereby providing improved physiological and psychological support for the consumer.

SUMMARY OF THE INVENTION

The invention is an improved meal-substitute food bar, called herein a meal-equivalent food bar because it is divided into segment portions which are equivalent to the courses of a conventional meal: appetizer, main-course, and dessert. The appetizer segment may include functional ingredients to stimulate appetite, the main-course segment includes the major nutrients of the meal, and may include functional ingredients which transition to the dessert segment which may include functional ingredients to depress or satiate appetite.

Further, the inventive food bar is divided frangibly into length-wise strips, each strip a meal-equivalent containing a selectable predetermined value of calories.

Thus it is an object of the invention to provide a meal-equivalent food bar, with segments which provide both gourmet variety and appetite control, thereby improving the physiological and psychological support of the food bar.

It is a further object of the invention to provide a dietetic meal-equivalent food bar which is made to provide proper nutrient values for a normal diet or a special diet, and allows the consumer to select the meal with a predetermined value of calories, thereby improving the consumer's caloric control.

A further object of the invention is to provide a meal-equivalent food bar of size, weight and format to be manufactured and packaged for portage in an ordinary pocket of clothing or baggage, and convenient eating.

BRIEF DESCRIPTION OF THE DRAWING

The single drawing shows a perspective view of the food bar in one rectangular form embodiment.

DETAILED DESCRIPTION OF THE INVENTION

One embodiment of the invention is seen in the drawing, where a rectangular meal-equivalent bar (1) is shown apportioned by transverse dividers (2) and (3) into segments which correspond to the courses of a conventional meal: appetizer (4), main-course (5), and dessert (6). The lengthwise divider (7) separates the meal bar into two strips (8) and (9), each strip a meal-equivalent selectable for a predetermined total number of calories. The main-course segment (5) is shown with laminations (10) which may form a sandwich and/or side-dish system, while segments (4) and (6) may be a mixture aggregate.

Referring to the drawing, the transverse dividers (2) and (3) may be: scored lines marking the segments, or segment connectors of edible binder material, or segment barriers of edible or inedible material. The strip divider (7) is a frangible junction which may be a deeply scored line or weak edible-binder connector.

Not shown in the drawing are markings and/or colors on the bar to identify segment ingredients and strip calories, and improve appeal.

Details of ingredients and manufacture for one embodiment are described in the example below.

EXAMPLE OAT-SOY MIX

This example is designed to approximate a meal-equivalent in a rectangular food bar format: 1½ inches wide, ¾ inch high, and 5 inches long; 3 ounces; and 500 total calories in a [50-15-30 (% cal)] 55-15-30 (% cal) distribution. The (vegetarian) ingredients are:

| | |
|---|---|
| Rolled Oats | 70 g (grams) |
| Oat Bran | 7 g |
| Soy Protein Isolate | 7 g |
| Vegetable Oil | 8 g |
| Dried vegetables | 20 g |
| Vinegar | 4 g |
| dried apple | 10 g |
| edible gum | 1 g |
| quinine | 20 mg |

The rolled oats and bran are mixed with the soy protein to form the bar-common material of oat-soy (84 g), to which the segment-appropriate ingredients will be added. The oat-soy mix is divided into portions: a quarter for the appetizer segment, half for the main-course, and quarter for the dessert. The vegetable oil is divided to mix 4 g with the appetizer and 4 g with the main-course. The vinegar is added to the appetizer. The dried vegetables are mixed with 0.5 g of the edible gum and added to the main-course. The remaining edible gum and quinine is mixed with the dried apple and added to the dessert portion. Sufficient water is added to each segment portion to form a pliable dough. Then the segments are formed, strip-divided, and baked (separately, or joined using an edible binder which may be a paste of protein isolate, starch, and water), and so packaged.

Note 1: Ingredients for appetite-stimulants may include high-fat and sour taste (eg: oil and vinegar); appetite-depressants may include low-fat, fiber, and bitter taste (eg: starch, edible gum, and quinine).

Note 2: For balanced nutrition, the oat-soy combination provides essential protein amino-acids, and provides carbohydrates of sugar, starch, and fiber; the vegetable oil provides a balance of saturated and unsaturated fatty acids.

Note 3: Alternative or additional ingredients may be carbohydrates derived from other grains, fruits, and vegetables; with proteins derived from nuts, beans, eggs, cheese, meat, fish, and fowl. Soluble and insoluble fiber sources include apples, potatoes, and gum plants. Vitamins, minerals, and other additives may be included.

With these teachings, the meal-equivalent food bar can be the basis of a method for improving the dietary support of food bars by varying the ingredients within the dietary guidelines for a variety of meals during the day.

Alternative embodiments of ingredients and format will be readily apparent to one of ordinary skill in the art in view of the teachings above, and fall within the scope and spirit of the claims.

I claim:

1. A meal equivalent food bar provides an improved meal replacement food bar as a bar meal, comprising:
   (a) a baked, cereal dough based, segmented food bar with transverse dividers which divide the food bar into segments corresponding to the plural courses of a conventional meal including appetizer, maincourse, and dessert,
   (b) each segment differs from its adjacent segments for contrast in size and at least one ingredient food type, such that:
      (1) the segments approximate the contrast in sequential courses of a conventional meal,
   (c) each segment comprises:
      (1) the baked, cereal based bar-common dough which is common to all segments of the bar meal, and
      (2) at least one segment-specific ingredient which is specific to each segment, respectively, to approximate the nutrition and contrast properties of its corresponding course, respectively, in a conventional meal,
   (d) the appetizer segment characterized by:
      (1) ingredients of quantity and food type to stimulate but not satiate appetite,
      (2) positioned at one end of the bar as a first course,
      (3) segment marking to identify as appetizer,
   (e) the main course segment characterized by:
      (1) ingredients of quantity and food type to provide the major nutrients of the meal,
      (2) positioned central between the bar ends,
   (f) the dessert segment characterized by:
      (1) ingredients of quantity and food type to end the meal approximating a conventional meal dessert course,
      (2) positioned at the end of the bar opposite the appetizer segment as a last course,
      (3) segment marking as a dessert,
   (g) said segments to provide a bar meal approximating the courses of a conventional meal in:
      (1) value of balanced nutrition,
      (2) effect of appetite control,
      (3) effect of contrasting sequential courses, (h) said segmented food bar packaged as a package bar:
   (1) dimensioned for convenient portage in an ordinary pocket of clothing,
   (2) dimensioned for convenient handling and eating by one individual consumer,
   (3) marked for appetizer starting end, whereby the consumer eats through the bar meal from appetizer to dessert to encounter segments in sequence which approximate a conventional meal in balanced nutrition for improved physiologic support, and which approximate the appetite control and contrast in sequential courses of a conventional meal for pleasurable psychological support for the individual consumer.

2. The food bar of claim 1, further comprising:
   at least one frangible lengthwise divider which divides the bar into strips, wherein
      each selectable strip is a meal-equivalent of predetermined calories, whereby
      the consumer can select a meal with a known number of calories.

3. The food bar of claim 2, wherein the frangible lengthwise divider is a deeply scored line.

4. The food bar of claim 2, wherein the frangible lengthwise divider is a weak edible binder connector.

5. The food bar of claim 1, wherein said segment dividers are frangible scored line markers.

6. The food bar of claim 1, wherein said segment dividers are edible barriers.

7. The food bar of claim 1, wherein said segment dividers are inedible separators.

8. The food bar of claim 1 wherein each segment of the bar is a mixed aggregate of segment-appropriate ingredients.

9. The food bar of claim 1 wherein the bar has a core of the bar-common ingredients, and each segment has outer layers of segment-appropriate ingredients.

10. The food bar of claim 1, wherein each segment has a core of segment-appropriate ingredients, and each segment has outer layers of common-bar ingredients.

11. The food bar of claim 1, wherein each segment has a core of a first set of segment-appropriate ingredients, and outer layers of further sets of segment-appropriate ingredients.

12. The food bar of claim 1, wherein:
   (d) the appetizer ingredients further include one or more appetite stimulants in an amount sufficient to stimulant appetite; and
   (e) the dessert ingredients further include one or more appetite suppressants in an amount sufficient to suppress appetite.

* * * * *